United States Patent
Kurz et al.

[11] 3,779,097
[45] Dec. 18, 1973

[54] MECHANISM FOR LOCKING SHIFTING MEMBERS IN CHANGE-SPEED TRANSMISSIONS

[75] Inventors: Dietrich Kurz, Stuttgart; Gerhard Oser, Oeffingen, both of Germany

[73] Assignee: Daimler-Benz, AG, Stuttgart-Unlerluerkheim, Germany

[22] Filed: May 19, 1972

[21] Appl. No.: 254,927

[30] Foreign Application Priority Data
May 21, 1971 Germany............... P 21 25 278.8

[52] U.S. Cl. ............................................. 74/477
[51] Int. Cl. ........................................... G05g 5/10
[58] Field of Search............... 74/473 R, 475, 476, 74/477, 483, 878

[56] References Cited
UNITED STATES PATENTS
2,317,761  4/1943  Haigh.................... 74/477
2,995,951  8/1961  Evans.................... 74/477 X
3,534,637  10/1970  Tomlinson............. 74/477 X
3,587,351  6/1971  Keller et al............ 74/477

FOREIGN PATENTS OR APPLICATIONS
476,389  5/1915  France..................... 74/477

Primary Examiner—Allan D. Herrmann
Attorney—Paul M. Craig, Jr. et al.

[57] ABSTRACT

A mechanism for locking the shifting elements in change-speed transmissions, especially in motor vehicle change-speed transmissions, in which, for example, three shifting shafts are provided, each carrying a shifting rocker arm having a pivot arm portion which actuates the locking mechanism by way of three pivotal locking levers which are thereby arranged at least axially symmetrical about a common center point and which are provided each with a notch facing three similarly arranged balls which in the neutral position can engage in a respective notch; the pivotal movement of a locking lever thereby forces the associated ball out of its notch and the thus displaced ball, in turn, then forces the other two balls into the other notches of the two other locking levers or retains the same within these notches, if they should be already present in these other notches.

14 Claims, 3 Drawing Figures

MECHANISM FOR LOCKING SHIFTING MEMBERS IN CHANGE-SPEED TRANSMISSIONS

The present invention relates to a mechanism for the locking of shifting devices in change-speed transmissions, especially in motor vehicle change-speed transmissions, in which one shifting rocker arm each having a swining arm is mounted on a respective one three pivotal shifting shafts, which swinging arm actuates a locking mechanism provided with at least one ball.

shiftable change-speed transmissions of this type with four of five forward speeds and a reverse speed possess as a rule three shifting forks, which can be axially displaced at will by the driver of the vehicle by way of linkages and shifting shafts, whereby the desired gear transmission ratio is engaged by way of correspondingly constructed coupling or clutch elements. However, since it must be avoided in all cost that two different speeds are engaged simultaneously, a locking means must be present which prevents with certainty the blocking of the transmission.

The aim of the present invention is to so construct a locking mechanism that upon rotation of a shifting shaft and upon engagement of a speed, the other two shifting shafts can be rotated only so far that a form-locking connection does not occur in any of the other two speed steps.

Furthermore, it is the aim of the locking mechanism of the present invention, starting from the center position in the neutral speed of the transmission to prevent during the simultaneous rotation of two shifting shafts that the two jaw clutches actuated by the shifting shafts receive a form-locking engagement.

The underlying problems are solved according to the present invention in that three pivotal locking levers are provided at least approximately axially symmetrically about a common center pint with one notch or groove each directed toward three similarly arranged balls adapted to enage into a corresponding notch or groove in the neutral position of the transmission, whereas a locking lever during its pivotal movement presses the associated ball out of its groove or notch and this ball, in turn, forcibly presses the two other balls into the two other grooves or notches of the two other locking levers or retains the two other balls in these two other grooves or notches.

According to a further features of the present invention, the pivot axis of each locking lever may be disposed along the radius intersecting the common center point, the respective ball center, and the respective groove center. Furthermore, a ball cage may be secured at the transmission housing which is provided with bores extending in the direction of the aforementioned three radii in which one ball each is guided.

Finally, the pivot pin of the locking lever may be secured at the same housing wall as the ball cage which is inserted into the same from the backside of the housing wall and is secured at the same with at least one bolt.

Accordingly, it is an object of the present invention to provide a mechanism for locking the shifting elements in change-speed transmissions which avoids by simple means the aforementioned shortcomings and drawbacks encountered in the prior art.

Another object of the present invention resides in a locking mechanism for locking the shifting devices in change-speed transmissions of motor vehicles which prevents with certainty the engagement of more than one speed.

A further object of the present invention resides in a locking mechanism of the type described above which is simple in construction, requires relatively few parts and can be manufactured in a relatively inexpensive manner, yet is extremely effective to prevent improper engagement of gears not intended to be engaged.

Still another object of the present invention resides in a device for locking the shifting members of change-speed transmissions in motor vehicles which prevents the form-locking engagement of a speed other than the speed intended to be engaged.

These and other objects, features and advantages of the present invention will become more apparent from the following description when taken in connection with the accompanying drawing which shows, for purposes of illustration only, two embodiments in accordance with the present invention, and wherein.

Figure 1:
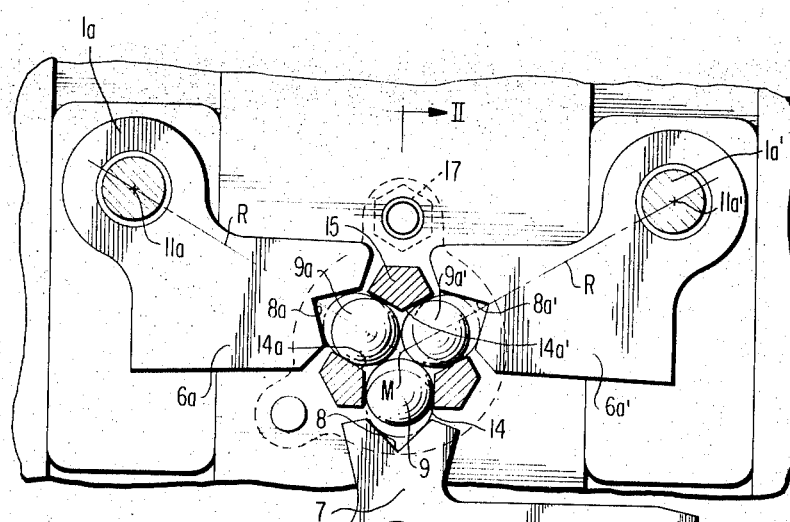
FIG. 1 is an elevational view of a locking mechanism in accordance with the present invention with the ball cage in cross section taken along line I—I of FIG. 2.

Referring now to the drawing wherein like reference numerals are used throughout the views to designate like parts, the transmission, not illustrated in detail and of any conventional construction, is shifted by three shifting shafts 1, 1a and 1a' in such a manner that a shifting shaft can carry out a pivot movement out of its center position in either direction, i.e., toward the right or toward the left, whence altogether two speeds can can be engaged per shifting shaft. The shifting rocker arm 2 is connected with the shifting shaft 1 for rotation in unison therewith so that two speeds can be engaged by way of the same in the manner described. This shifting rocker arm 2 includes a pivot arm portion 3 whose end section 4 partially constructed of spherical shape engages in a fork-shaped end section 5 of a pivotal locking lever 6. The pivotal locking lever 6 is constructed as two-armed bell crank. At its bell crank arm portion 7 there is provided a groove or notch 8 into which the ball 9 can engage in the position of the locking lever 6 illustrated in FIG. 1.

The pivotal locking lever 6 is secured in its pivot axis 11 at a wall 13 (FIG. 2) of the housing by means of the pivot bolt 12.

The ball 9 is guided in a bore 14 of a ball cage 15. Axially symmetrical to the bore 14, i.e., displaced by 120° on each side with respect to this bore 14, are provided two further bores 14a and 14a' within the ball cage 15; balls 9a and 9a' which are also guided in these bores 14a and 14a', again can engage in notches 8a and 8a' of the pivotal locking levers 6a and 6a'. These locking levers 6a and 6a' are so constructed and arranged that the radii stating from the center point M and intersecting the center points of the balls 9a and 9a' extend through the pivot axes 11a and 11a' which may also simultaneously form the axes of the shifting shafts 1a and 1a'.

The locking levers 6a and 6a' may also be secured at the wall 13 of the housing by means of bolts 12 in a manner similar as the locking lever 6.

Figure 2:
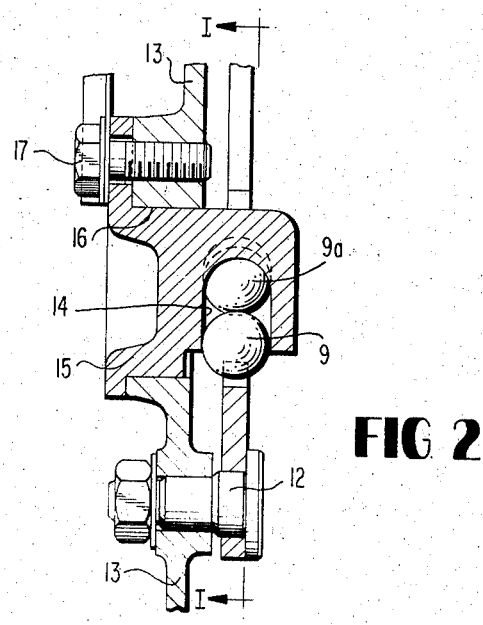
FIG. 2 is a partial cross-sectional view through the locking mechanism according to the present invention taken along line II—II of FIG. 1.

The ball cage 15 is introduced into the opening 16 from the side of the housing disposed toward the left in FIG. 2 with the ball guide means in front and is retained by means of bolts 17.

The pivotal locking levers 6, 6a and 6a ' are each illustrated in the drawing, in the neutral transmission position. In this position of the locking levers, the balls 9, 9a and 9a' may assume any desired position, that is either inside or outside of the respective notches or grooves 8, 8a and 8a'.

If a speed is now engaged in any known manner, in that, for example, the shifting shaft 1 is pivoted toward the one or other side and therewith simultaneously the shifting rocker arm 2 is pivoted toward the one or other side, then simultaneously therewith, the associated pivotal locking lever 6 is pivoted toward that one or other side. The lower ball 9, as illustrated in the drawing, is raised or lifted thereby. As a result thereof, the ball 9 presses the two other balls 9a and 9a' out of the center into the two notches or grooves 8a and 8a' or prevents the balls 9a and 9a' from leaving the grooves 8a and 8a', if the balls 9a and 9a' should already be present in these grooves 8a and 8a'. It is assured thereby that after the engagement of a speed at the shifting shaft 1 and after the pivoting of the pivotal locking lever 6, the other two locking levers 6a and 6a' and therewith the other shifting shafts 1a and 1a' can no longer be pivoted. An engagement of a speed by a rotation of the two other shifting shafts is thereby rendered impossible.

In a similar manner the locking mechanism acts analogously if one of the two pivotal locking levers 6a or 6a' is pivoted and one of the balls 9a and 9a' is displaced out of one of the notches 8a or 8a'.

Figure 1A:
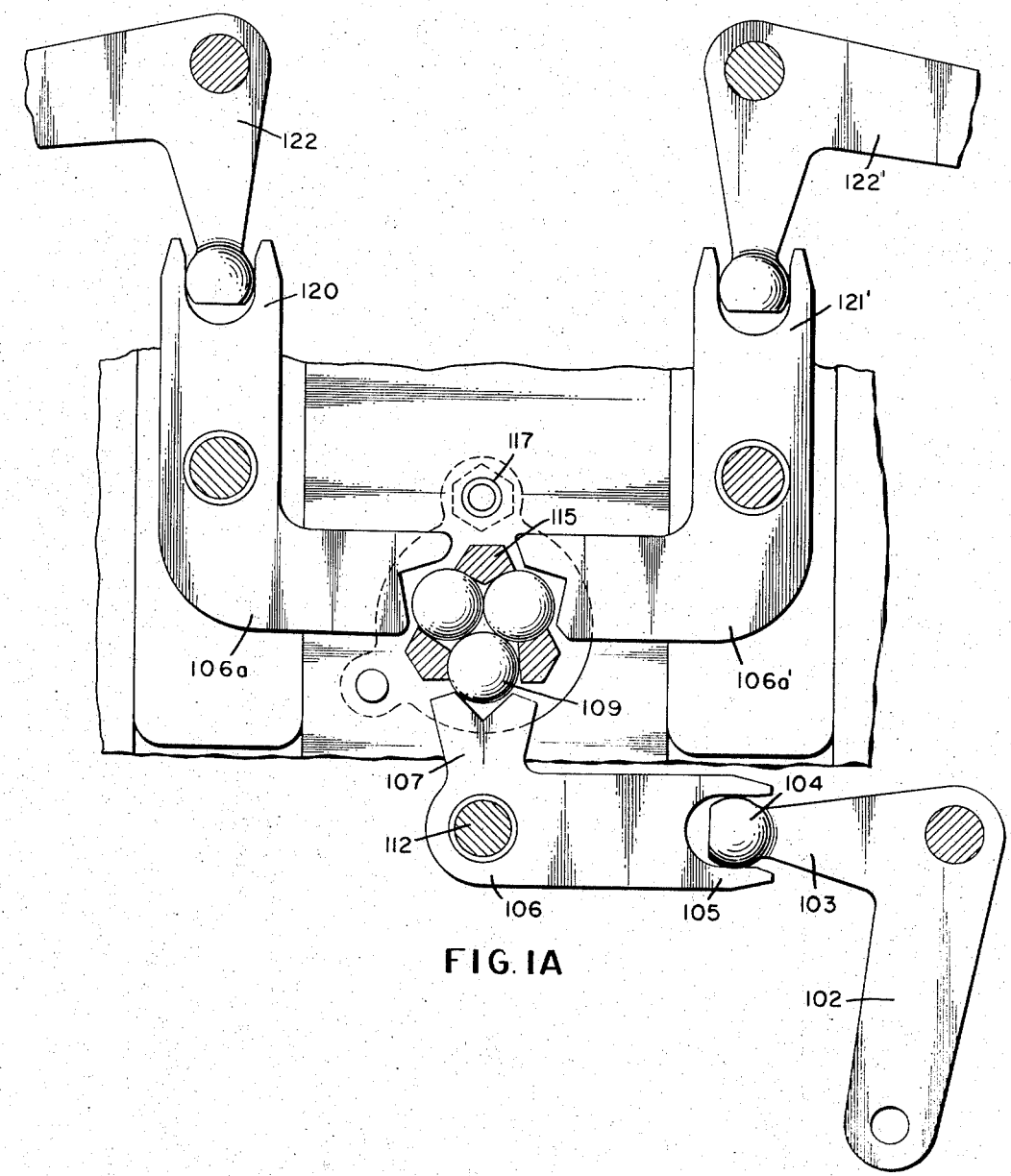
FIG. 1A is an elevational view similar to FIG. 1 which illustrates a modified locking mechanism in accordance with the present invention.

The embodiment of FIG. 1A includes reference numerals corresponding to like reference numerals, reduced by 100, of FIG. 1 for depicting like parts. This FIG. 1A embodiment differs from the FIG. 1 embodiment only in that locking levers 106a, 106a' have extensions 120, 120' engageable with respective shifting rocker arms 122, 122' in a manner similar to that described above for locking lever 6 and shifting rocker arm 2 of the FIG. 1 embodiment.

While we have shown and described only two embodiments in accordance with the present invention, it is understood that the same is not limited thereto but is susceptible of numerous changes and modifications as known to those skilled in the art. For example, the present invention with a corresponding construction and adaptation (more than three shifting shafts, pivotal locking levers and balls) can also be applied to transmission with speeds altogether in excess of six speeds. Hence, we do not wish to be limited to the details shown and described herein but intend to cover all such changes and modifications as are encompassed by the scope of the appended claims.

What we claim is:

1. A mechanism for locking shifting elements in change-speed transmissions, in which the different speeds are engaged by means of at least three pivotal shifting shafts, characterized in that three pivotal locking lever means which are operatively connected with the shifting shafts, are arranged in the locking mechanism at least approximately axially symmetrically about a common center point and are each provided with a notch means directed toward three similarly arranged ball means of the locking mechanism, the respective ball means being able to engage in the notch means in the neutral position, while a locking lever means during its pivot movement displaces the associated ball means out of its notch means and said ball means, in turn, assures that the other two ball means are pressed into the notch means of the other two locking lever means.

2. A mechanism according to claim 1, characterized in that the pivot axis of each locking lever means is disposed substantially along a radius intersecting the common center point, the respective ball center and the respective notch center.

3. A mechanism with a transmission housing according to claim 2, characterized in that a ball cage means is secured at the transmission housing, said cage means being provided with bore means extending in the direction of the aforementioned radii, in which a respective ball means each is guided.

4. A mechanism according to claim 3, characterized in that a pivot means of the locking lever means is secured at the same housing wall of the transmission housing as the ball cage means.

5. A mechanism according to claim 4, characterized in that the pivot means of the locking lever means is secured at the same housing wall as the ball cage means by means of a threaded bolt.

6. A mechanism according to claim 4, characterized in that the pivot means of at least some locking lever means is constituted by a respective shifting shaft.

7. A mechanism according to claim 6, characterized in that at least one shifting rocker arm means is mounted on a corresponding shifting shaft, said shifting rocker arm means actuating with a rocker arm portion thereof the corresponding locking lever means.

8. A mechanism according to claim 1, characterized in that a shifting rocker arm means is mounted on each of the shifting shafts to actuate the locking lever means.

9. A mechanism with a transmission housing according to claim 1, characterized in that a ball cage means is secured at the transmission housing, said cage means being provided with bore means in which a respective ball means each is guided.

10. A mechanism according to claim 9, characterized in that a pivot means of the locking lever means is secured at the same housing wall of the transmission housing as the ball cage means.

11. A mechanism according to claim 1, characterized in that pivot means of at least some locking lever means are constituted by a respective shifting shaft.

12. A mechanism according to claim 11, characterized in that at least one shifting rocker arm means is mounted on a corresponding shifting shaft, said shifting rocker arm means actuating with a rocker arm portion thereof the corresponding locking lever means.

13. A mechanism according to claim 1, characterized in that at least one shifting rocker arm means is mounted on a corresponding shifting shaft, said shifting rocker arm means actuating with a rocker arm portion thereof the corresponding locking lever means.

14. A mechanism according to claim 13, characterized in that a shifting rocker arm means is mounted on each of the shifting shafts to actuate the locking lever means.

* * * * *